United States Patent
Kaiser et al.

[15] 3,652,393
[45] Mar. 28, 1972

[54] ARRANGEMENT FOR BRINGING ABOUT NUCLEAR FUSION REACTIONS

[72] Inventors: Wolfgang Kaiser; Hans Opower; Heinz Puell, all of Technische Hoshschule Munich, Physik Department, no. 21, Arcisstrasse, Munich, Germany

[22] Filed: Feb. 8, 1968

[21] Appl. No.: 704,026

[30] Foreign Application Priority Data

Feb. 10, 1967 Germany..............................K 61394

[52] U.S. Cl....................................176/1, 313/61, 250/84.5
[51] Int. Cl. .........................................................G21b 1/00
[58] Field of Search......................176/1; 250/84.5; 331/94.5

[56] References Cited

UNITED STATES PATENTS

| | | | |
|---|---|---|---|
| 3,094,474 | 6/1963 | Gale | 176/1 |
| 3,118,964 | 1/1964 | Buzawa | 350/177 |
| 3,247,459 | 4/1966 | Van Overbeck | 330/4.3 |
| 3,346,458 | 10/1967 | Schmidt | 176/1 |
| 3,378,446 | 4/1968 | Whittlest | 176/1 |
| 3,419,321 | 12/1968 | Barber et al. | 350/46 UX |
| 3,444,377 | 5/1969 | Hora et al. | 331/94.5 |
| 3,445,333 | 5/1969 | Lecomte | 176/1 |

FOREIGN PATENTS OR APPLICATIONS

| | | | |
|---|---|---|---|
| 1,240,668 | 8/1960 | France | 176/1 |

OTHER PUBLICATIONS

E. B. Rechsteiner and Saxe, " Mosers and Laser," pub. by Technology Markets, Inc. 509 Fifth St. N.Y. 17, N.Y. p. 57 May 23, 1962

*Primary Examiner*—Reuben Epstein
*Attorney*—Lowry, Rinehart, Markva & Smith

[57] ABSTRACT

The invention provides an arrangement for bringing about nuclear fusion reactions comprising a known system of two synchronously activated lasers.

These lasers, facing each other on a common optic axis, emit light beams for producing a plasma. They are focused on two deuterium or deuterium-tritium containing concave or flat targets after having passed two objectives with hollow cones, which impart a tubular cross section to the light beams. Also the lasers themselves can be designed to emit tubular light beams.

The concave or flat targets having a surface roughly corresponding to the area of the focal point are disposed perpendicularly to the common optic axis of the laser system and symmetrically with respect to the center plane.

Each target is situated on that side of said plane remote from its associated objective, which has a numerical aperture of nearly 1.

6 Claims, 3 Drawing Figures

INVENTORS:
WOLFGANG KAISER
HANS OPOWER
HEINZ PUELL

BY
Lowry, Rinehart & Markva
ATTYS.

ARRANGEMENT FOR BRINGING ABOUT NUCLEAR FUSION REACTIONS

BACKGROUND OF THE INVENTION

This invention relates to an arrangement for bringing about nuclear fusion reactions. Known arrangements of such a kind, i.e., apparatus for the generation of a plasma, have the drawback of being expensive and requiring considerable structural means. Although other types of apparatus, such as accelerators as neutron sources by nuclear fusion reactions are less expensive, they have the drawback that the duration of the neutron pulses cannot be made extremely short.

SUMMARY OF THE INVENTION

The object of the present invention is to generate a controlled chain reaction within very small dimensions.

To attain this object, the present invention provides an arrangement for bringing about nuclear fusion reactions, comprising a system of two synchronously activated lasers emitting light beams focused on targets for the purpose of producing a plasma, wherein said lasers face each other on a common optic axis to emit their light beams towards each other and each light beam is focused by an objective associated with each laser and having a numerical aperture of nearly 1 on one of two deuterium or deuterium-tritium containing targets having a surface roughly corresponding to the area of the focal point, and wherein said targets are disposed perpendicularly to the common optic axis of the laser system and symmetrically with respect to the center plane, each on that side of said plane remote from its associated objective.

The arrangement proposed by the invention has the advantage of being able to produce very short period neutron pulses with a minimum of means. It also provides an important step forward in the direction of solving the problem of producing a controlled chain reaction within minimum dimensions.

The advantages of the arrangement are more particularly due to the fact that the light which is omnidirectionally reflected by the plasma formed at the target surfaces is nearly entirely returned into the associated laser because of the large numerical aperture of the objectives. Hence the light energy of the lasers is nearly completely transformed into plasma energy. By focusing a high energy light pulse on the surface of a solid, a high energy plasma film (microplasma) is known to form at the focal point. Investigations have shown that these plasmas emit ions having kinetic energies of many kev. within a narrow angular region about the normal to the surface as preferred direction. Despite their high kinetic energies the temperature (i.e., the energy averaged over all directions) of the electrons and particularly of the ions remains relatively low, since the disc-like geometry of the plasma causes the energy to manifest itself in a directional expansion which gives little opportunity for collisions between the ions. Even if the targets are very thin, for instance in the form of foils only a few $\mu$m. thick, the ion stream is always directed towards the incident light.

Substantially the arrangement according to the invention serves a two-fold object:

1. By means of a system comprising two synchronously activated lasers two microplasmas are produced which emit ions travelling in contrary directions. Since the surface of the targets must be normal to the optic axis of the light beams to permit the beam to be concentrated in a small focal point, the targets must be relatively spaced as hereinbefore described. Although this arrangement means that some of the incident light will be masked by the intervening target, this difficulty is in practice substantially overcome in the arrangement according to the invention by using objectives having a numerical aperture of nearly 1 for focusing the light. Moreover, a volume of plasma will be confined between the targets in which the ions emitted by each target run contrary to each other and give rise to collision reactions because of their considerable density. If the targets contain deuterium or a deuterium-tritium mixture, nuclear fusion reactions will occur in this space between the heavy hydrogen ions, provided the intensity of the incident light is high enough. The adjustability of the ratio of diameter to spacing of the targets also permits the density and escape rate of the stationary plasma between the targets to be controlled.

2. A high proportion of the light is partly diffused reflected by the plasma and returned as a parallel beam into the laser as a result of the large objective aperture. This light is therefore amplified and sent back to the plasma. The proposed arrangement thus permits the light energy to be substantially completely converted to plasma energy with very little loss.

In an arrangement according to the invention it is desirable to provide for adjustment of the ratio of diameter to spacing of the targets for the purpose of controlling the amount of plasma escaping around the sides and of thereby also controlling the nuclear fusion reaction.

It is also desirable to impart a hollow tubular cross section to the light beams by the interposition of hollow cones on the entry side of the objectives.

Alternatively the lasers themselves may be appropriately designed to emit light beams that are tubular in cross section.

The undesirable masking of the incident light by the targets can thus be overcome.

Finally, in an arrangement according to the invention, it may be useful to compose each emitting laser of a plurality of lasers working in tandem. Such tandem arrangements have already been employed in optical amplifiers for travelling waves.

BRIEF DESCRIPTION OF THE DRAWING

An embodiment of the invention will now be described by way of example and with reference to the accompanying drawing, in which.

DESCRIPTION OF THE PREFERRED EMBODIMENT

Figure 1:
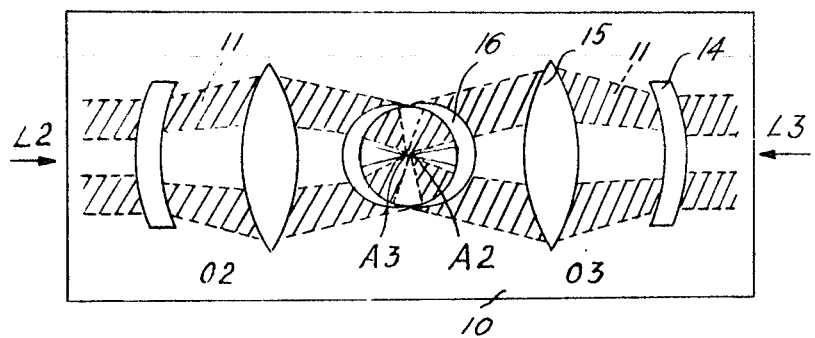
FIG. 1 is a sketch illustrating the manner in which the objectives and targets are disposed in principle.
Figure 2:
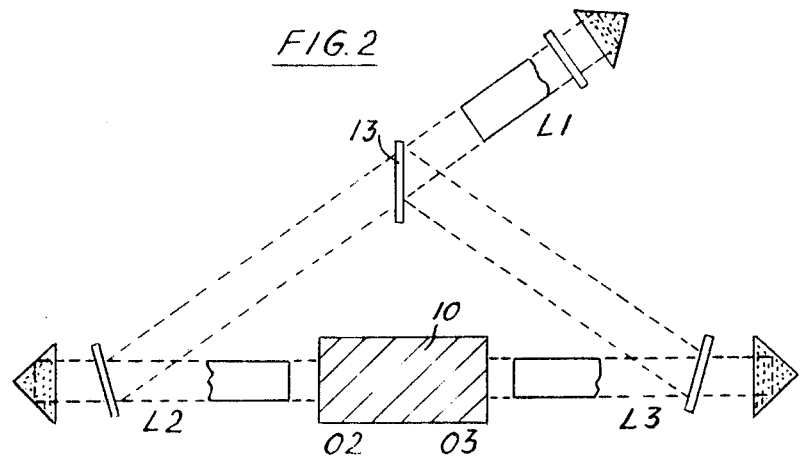
FIG. 2 is a schematic drawing showing the overall arrangement.

FIG. 2 illustrates the general disposition of the several lasers. Two lasers L2 and L3 each face a vacuum chamber 10 on opposite sides and are disposed on a common optic axis. The vacuum chamber 10 contains objectives O2 and O3 and targets A2 and A3, as shown in FIG. 1. The two lasers L2 and L3 are simultaneously activated by an auxiliary laser L1 via a semitransparent mirror 13. Such a method of control has already been proposed, though for an entirely different purpose, namely for achieving maximum amplification of the laser pulse (giant pulse), and in the prior arrangement the lasers are disposed in parallel side-by-side. The basic problem is a different one. Moreover, in the arrangement shown in FIG. 2 the two lasers L2 and L3 face each other and share a common optic axis.

In the prior arrangement it had already been recognized that for the generation of a plasma the light beams emitted by two parallel lasers must be directed onto a common target. However, a nuclear fusion reaction cannot thus be initiated, because the resultant directional expansion of the plasma prevents collisions between the ions from taking place. In contradistinction thereto the light beams 11 emitted by the two lasers L2 and L3 in the proposed arrangement are each directed onto a target A2 and A3 in a particular way which is illustrated in FIG. 1. The targets A2 and A3 are located symmetrically with respect to the center plane and perpendicularly to the optic axis in the focal planes of the associated objectives O2 and O3. As will be understood from FIG. 1, the two targets are disposed on the side of that objective with which they are not associated. Consequently the generated ion streams will interpenetrate in contrary directions.

Figure 3:
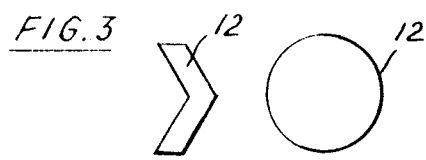
FIG. 3 is a side and plan view of a cone for the generation of a tubular beam.

In the arrangement shown in FIG. 1 the effective light beams emitted by the two lasers L2 and L3 are already tubular. However, such tubular beams may also be produced with the aid of hollow cones 12, as shown in FIG. 3, said cones being located on the entry sides of the objectives in such a way that the apex of each cone faces the objective. This has the advantage of avoiding mutual masking of the targets and of part of the beam being cut off. The optical systems O2 and O3 may each be composed of a plurality of lenses 14, 15, 16. Only three are shown in FIG. 1. It will also be understood from FIG. 1 that the lenses are so arranged that their angular aperture is nearly 1.

Furthermore, it is desirable to provide targets A2 and A3 in the form of hollow concave bodies so disposed that their concavities face each other. The plasma produced at the lateral walls of the hollow bodies will then interact inside the confined space and the greater abundance of ion collisions within this space will provide an energy distribution in the plasma imparting a greater energy of expansion to some of the ions leaving the hollow body than would be the case if the target were flat.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An arrangement for bringing about nuclear reactions, comprising a system of two synchronously activated lasers emitting light beams focused on targets for the purpose of producing a plasma, wherein said lasers face each other on a common optic axis to emit their light beams towards each other and each light beam is focused by an objective associated with each laser and having numerical aperture of nearly 1 on one of two deuterium or deuterium-tritium containing targets having a surface roughly corresponding to the area of the focal point, said targets being spaced apart and disposed perpendicularly to the common optic axis of the laser system and symmetrically with respect to the center plane, each on that side of said plane remote from its associated objective whereby microplasmas are produced at each target and the ions emitted therefrom are projected towards each other causing collisions with the resultant generation of energy.

2. An arrangement as claimed in claim 1, wherein the ratio of the diameter to the spacing of said targets is adjustable for controlling the sideways escape of the plasma and hence the nuclear fusion reaction.

3. An arrangement as claimed in claim 1, wherein a tubular cross section is imparted to the light beams by hollow cones provided on the entry side of the objectives.

4. An arrangement as claimed in claim 1, wherein the lasers themselves are designed to emit tubular light beams.

5. An arrangement as claimed in claim 1, wherein each laser is composed of a plurality of lasers operating in tandem.

6. An arrangement as claimed in claim 1, wherein the targets are concave and disposed with their concavities facing each other.

* * * * *